United States Patent
Blum

(10) Patent No.: US 10,762,130 B2
(45) Date of Patent: Sep. 1, 2020

(54) METHOD AND SYSTEM FOR CREATING COMBINED MEDIA AND USER-DEFINED AUDIO SELECTION

(71) Applicant: Omfit LLC, Santa Barbara, CA (US)

(72) Inventor: Scott Blum, Santa Barbara, CA (US)

(73) Assignee: Omfit LLC, Santa Barbara, CA (US)

( * ) Notice: Subject to any disclaimer, the term of this patent is extended or adjusted under 35 U.S.C. 154(b) by 0 days.

(21) Appl. No.: 16/522,031

(22) Filed: Jul. 25, 2019

(65) Prior Publication Data
US 2020/0034385 A1    Jan. 30, 2020

Related U.S. Application Data

(60) Provisional application No. 62/703,095, filed on Jul. 25, 2018.

(51) Int. Cl.
G06F 16/638    (2019.01)
G06F 16/683    (2019.01)
G06F 16/783    (2019.01)

(52) U.S. Cl.
CPC .......... *G06F 16/639* (2019.01); *G06F 16/685* (2019.01); *G06F 16/7834* (2019.01); *G06F 16/7837* (2019.01)

(58) Field of Classification Search
CPC ... G06Q 30/02; G06F 16/639; G06F 16/7834; G06F 16/685; G06F 16/7837; G06F 16/4387; G06F 16/635
USPC ........................................ 707/7.29; 715/716
See application file for complete search history.

(56) References Cited

U.S. PATENT DOCUMENTS

| | | | |
|---|---|---|---|
| 8,230,343 B2 | 7/2012 | Logan | |
| 8,819,043 B2 | 8/2014 | Durante | |
| 9,697,813 B2 | 7/2017 | Lyske | |
| 9,852,736 B2 | 12/2017 | Sharma | |
| 2005/0060741 A1 | 3/2005 | Tsutsui | |
| 2006/0204214 A1 | 9/2006 | Shah et al. | |
| 2009/0325602 A1 | 12/2009 | Higgins et al. | |
| 2010/0042682 A1 | 2/2010 | Kaye | |
| 2010/0251305 A1 | 9/2010 | Kimble et al. | |
| 2011/0054646 A1 | 3/2011 | Hernandez et al. | |
| 2011/0295843 A1 | 12/2011 | Ingrassia, Jr. et al. | |
| 2012/0308196 A1 | 12/2012 | Bowman | |
| 2013/0170813 A1 | 7/2013 | Woods et al. | |
| 2014/0180762 A1* | 6/2014 | Gilbert .................. | G06F 16/686 705/7.29 |

OTHER PUBLICATIONS

International Search Report and Written Opinion dated Oct. 21, 2019 in International Patent Application PCT/US2019/043397.

* cited by examiner

*Primary Examiner* — Andrey Belousov
(74) *Attorney, Agent, or Firm* — Joan T. Kluger; Barnes & Thornburg LLP

(57) ABSTRACT

A method and system for combining user-defined music, sound effects or other audio content selections with video or other media, an activity or an event experience. Music attributes are associated with music files. A user selects a music category. Video or other media are time segmented. Each segment is associated with the music attributes. Using a time clock, music in the user-selected category is combined with video for a personalized experience.

21 Claims, 9 Drawing Sheets

METHOD AND SYSTEM FOR CREATING COMBINED MEDIA AND USER-DEFINED AUDIO SELECTION

CROSS-REFERENCED TO RELATED APPLICATIONS

This application claims priority to U.S. provisional patent application 62/703,095, filed Jul. 25, 2018, entitled, Method and System for Creating Combined Media and User-Defined Music Selection.

FIELD

The present disclosure relates to customized entertainment experiences. In particular, the present disclosure relates to combining a first user-defined media, such as music, with a second non-user-defined media of a different type, such as video.

BACKGROUND

Activity-related media, such as workout videos, audio books, etc., may be tied to specific music or types of music. Whereas the activity may appeal to a variety of people, the associated music may not be as broadly embraced, or at a minimum may not be the type of music one would select given the option to do so. It would be advantageous for individuals to select music separately from the activity.

Additionally, activities may lend themselves to varied music attributes during the duration of the activity. A particular song or compilation of songs may not provide the optimal attributes for all portions of the activity. Accordingly, it would be advantageous to easily map music with the desired attributes to selected portions of the activity to enhance a user's experience.

SUMMARY OF THE INVENTION

A method and system are disclosed for combining user-defined music selections with video or other media, an activity or an event experience, the latter group of which will be designated as "non-audio media" herein. It is noted that embodiments also include combining user-defined audio selections with other audio. Additional combinations of media types may also be created using the disclosed methods and systems. A media file of a first media type is tagged based on desired attributes of a second media type. For example, a video (first media file) may be partitioned into a plurality of time segments, wherein each segment is associated with one or more music attributes that would coordinate well with the video segments. A plurality of song files (second media type) is also tagged with attributes. In this example, the attributes may be, for example, tempo, key and intensity level. A user then selects a type of music, such as a particular genre. A user-defined playlist is generated based on the user's selected genre that identifies particular songs or portions of songs associated with the various attributes. A combined media experience, for example music and video, can then be created based on the user's preferences.

Various rules may be incorporated into the method and system to assure compliance with applicable license agreements, laws or other requirements.

DESCRIPTION OF DRAWINGS

The detailed description refers to the accompanying figures, which depict illustrative embodiments, and in which.

DETAILED DESCRIPTION OF EMBODIMENTS

The figures and descriptions provided herein may have been simplified to illustrate aspects that are relevant for an understanding of the devices, systems, and methods, described herein while eliminating, for the purpose of clarity, other aspects that may be found in typical devices, systems, and methods. Those of ordinary skill in the art may recognize that other elements or operations may be desirable or necessary to implement the devices, systems, and methods described herein. Because such elements and operations are well known in the art, and because they do not facilitate a better understanding of the present disclosure, a discussion of such elements and operations may not be provided herein. However, this disclosure is deemed to inherently include all such elements, variations, and modifications to the described aspects that could be implemented by those of ordinary skill in the art.

The term "software application" is used herein to mean a program that instructs a computer to perform a specific set of instructions or execute a process. It may be a collection of one or more related software programs. A software application may enable a user to do any combination of the following, for example, enter, store, view, modify or extract information from files or databases. In some instances any of the functions may be performed automatically. For example a software application may automatically retrieve and store information from a database. A trigger event or user input may prompt the software application to retrieve and/or store the data, or execute a process. As one of ordinary skill in the art understands, a software program is based on one or more algorithms that provide the steps of the processes carried out. Thus, the terms and phrases, application, algorithm, software application and program may be used interchangeably. In general, the terms mean a set of electronic instructions that instructs a computer to perform a specific set of processes. As used herein, any of these terms may include a collection of such applications.

Figure 1:
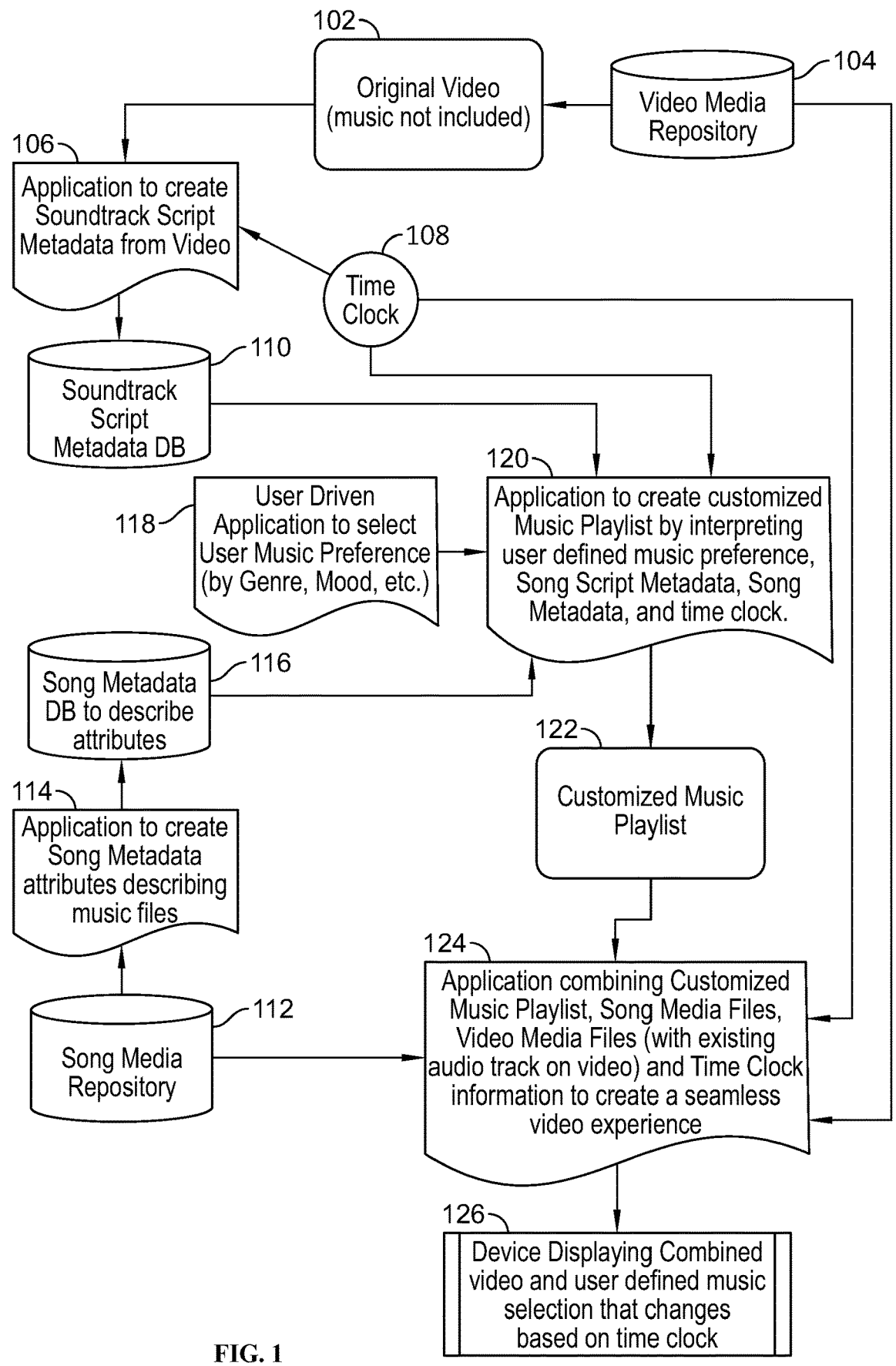
FIG. 1 depicts a method for creating a combined video and user-defined music selection according to an illustrative embodiment.
Figure 2:
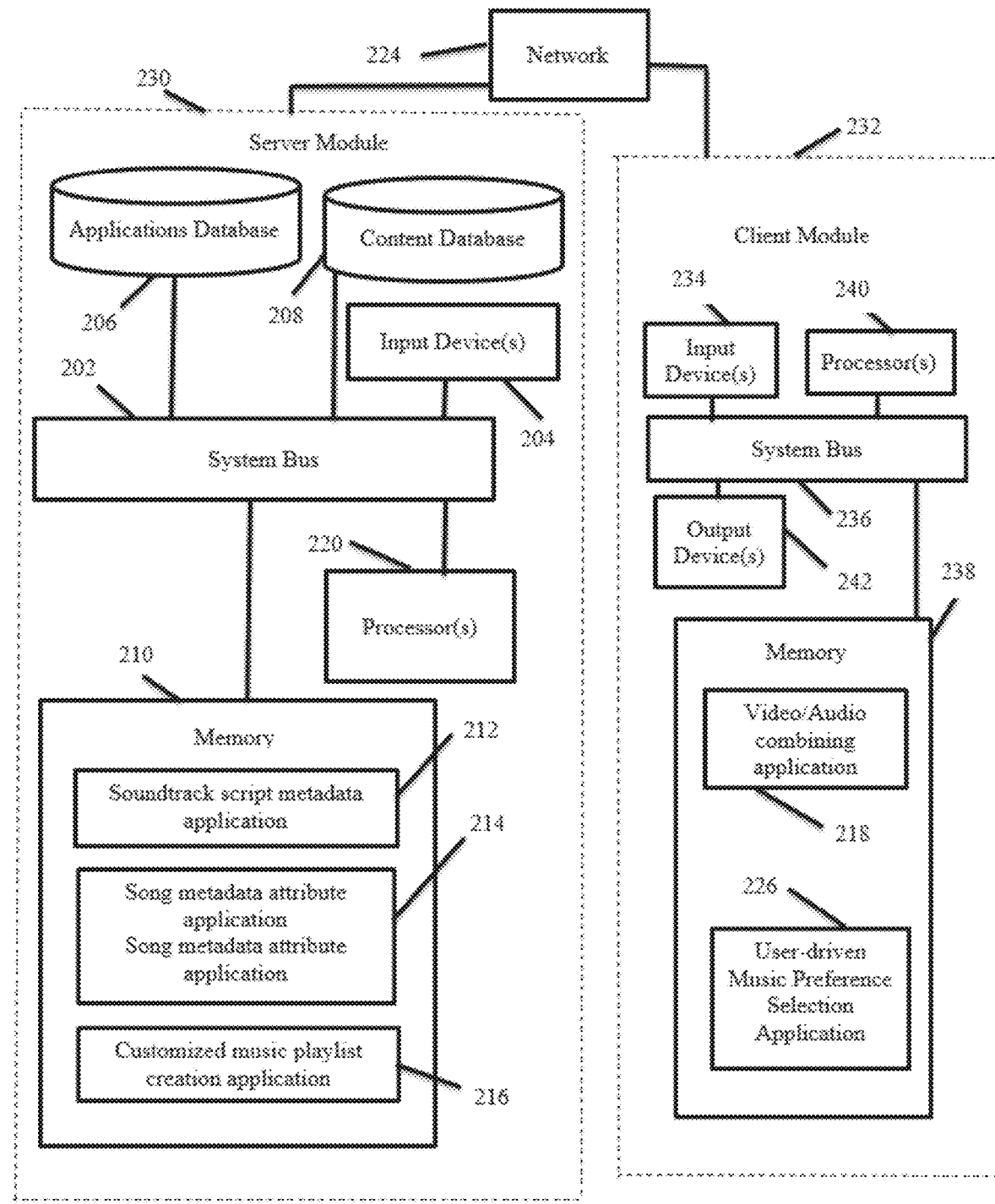
FIG. 2 depicts an illustrative system for combining user-defined music with video.

A method and system are disclosed for combining user-defined music selections with video or other media, an activity or an event experience. An illustrative method is depicted in FIG. 1 as it pertains to creating a combined video and user-defined music selection according to an illustrative embodiment. FIG. 2 depicts an illustrative system for combining user-defined music with video. As will be described further below, the method and system depicted in FIGS. 1 and 2 can be applied to other user experiences. The term "technology" may be used herein to include the disclosed method and system and associated non-transitory computer-readable media for simplicity. All embodiments described herein are considered illustrative examples of the broader technology.

The video and audio portions of the combined media presentation are created separately but coordinated through a trigger event that may include a time clock so segments of the video can be associated with different music selections. The music selections may be for example, portions of a single music selection or portions of multiple music selections. Each segment can be associated with music attributes, such as energy level, tempo, key, "danceability," etc. Database records are created or provided that include metadata that identify the attributes as they pertain to the music and to specific portions of the music. The term "music" or "music selection" as used herein may include songs, i.e. lyrics set to music. In various further embodiments, audio other than music or in addition to music may be used. Appropriate music or music segments can then be associated with the corresponding portions of the video based on the attributes. In other illustrative embodiments, portions of an event or activity can be associated with attributes and then combined accordingly with music. For example, a theme park ride can be divided into segments marked by trigger events, and each segment associated with music attributes. Music can then be linked to the ride segments based on the attributes that have been identified for each ride portion.

It is noted that where a "time clock" is referenced herein, other trigger events may be substituted.

Music attributes can be assigned manually, or through algorithms designed to recognize and tag the music. For example, music metadata can be manually created by musicologists, or artificial intelligence can be implemented, which extracts the attributes from waveforms. A combination of the two methods can also be used.

Metadata are instrumental in managing and coordinating the audio with other media files and related information. In general, the metadata describe a digital asset by use of metatags. The metatags can be used by the various algorithm described herein, for example, to retrieve certain songs or portions of songs or coordinate video and audio based on a time clock. Metadata may be descriptive, structural or administrative. The attributes described herein are examples of "descriptive metadata." Various categories are examples of "structural metadata." Other metadata that does not identify specific attributes, such as time and date fall under the category of "administrative metatags."

A user may select a music preference, for example by mood or genre through a user-driven software application. A customized playlist can be created, at least in part, based on the user's preference, song script metadata, soundtrack script metadata and a time clock.

FIG. 1 depicts a schematic of an illustrative embodiment for generating combined video and user-defined music. In step 102 a user obtains a video file or files from a video media repository 104. In variations of this illustrative embodiment, other media types may be obtained. Thus, more generally, repository 104 can be referred to as source media repository. In this illustrative embodiment original video is obtained with no music included.

A software application is provided in step 106 to create soundtrack script metadata from the selected video and time clock information, represented in circle 108, related to the video to create metadata tags for each desired change in musical attributes. Alternatively or in addition, pre-created soundtrack script metadata may be used in the method to create the combined video and user defined music selections. Applications to automatically score a video or other source media, may use image recognition or other sensors to analyze motion, brightness, hues, tempo and intensity. Upon recognizing a particular characteristic by a sensor, the video can be tagged accordingly.

It is noted that circle 108 may represent trigger events other than a time clock as described herein. For example, in a theme park ride, a trigger event may be effectuated by a radio frequency transmitter, or other signal generated by a device on a car moving through the theme park ride. A unique identifier may be combined with a proximity sensor to inform the system that a particular car is at a particular experience.

Musical attributes may include, for example, tempo, music key, energy level, beat, pitch, harmony, intensity, music modality, vocal presence, percussive presence, musical density, dance level, happiness, sadness, aggressiveness and fluidity,) and attribute range (for example as a portion of the full 0-100%). Many attributes can be expressed as a percentage of a range, for example intensity. Other attributes may not lend themselves to expression in this manner, such as tempo. There can be multiple attributes per time marker.

In step 110, a soundtrack script metadata database is created from results of the creation of soundtrack script metadata in step 106. In other words, step 110 involves scoring an experience, such as a fitness video or theme park ride. The experience is tagged according to trigger events, which may include a time clock.

A song media repository 112 provides a selection of song or other audio files. A software application is applied in step 114 to a selected song or songs from song media repository 112 to create song metadata attributes that describe the selected music files. Alternatively, or in addition, pre-created metadata may be obtained and used in the method to create the combined media and user-defined music selections. In step 116 a song metadata database is created from the results of step 114. In an alternative embodiment, existing or purchased metadata can be input to song metadata database 116, wherein application 114 need not be implemented. i.e. song repository 112 would be input directly into song database 116.

In step 118 a software application is provided through which a user can select music preferences, i.e. user-defined music preferences. In an illustrative embodiment, a user selects from broad categories such as genre. Preferences for a user to select may be one or more of the following, for example, era ('60s, '70s, etc.), jazz, classical, rock, gospel, techno, emotional spectrum, instrument type, male/female vocalist, artist, theme and culture. The options will depend, at least in part, on the metadata associated with the songs in the song metadata database, or with other forms of audio. However, selection of music with such attributes may be determined by the tagged video or other media. In other words, a user may select a genre, and then according to how the selected video is tagged, music or music segments from the user's selected music type may be automatically identified to be played for durations according to the tagged video. For example, if a 20 second segment of the video is tagged to coordinate with high intensity music, then a song or portion of a song from the user's selected genre having high intensity will be matched to that 20 second segment of the video. The available preferences for user selection will correspond to the type of audio involved. The preferences listed above pertain to music. Some of these may also pertain to other types of audio, such as sound effects. Additional preference options may be offered for non-music audio. In general, preference options will correspond to possible attribute variables associated with the audio type.

In step 120 an application is applied to create a customized music playlist 122 from the soundtrack script metadata database 110, song metadata database 116, time clock 108 and user selection of music preference 118 that was generated by a user-driven software application.

In step 124 a software application combines the customized playlist 122, song media file(s) from song media repository 112, video media file(s) from video media repository 104 with existing audio track on the video if present, and time clock information 108, to create a video experience that provides music of a category selected by the user, that is coordinated with the video in a desired manner. By "desired manner" it is meant according to a video tagged manually by an individual or individuals who are skilled in associating music video segments with music of certain attributes that are deemed appropriate for the segments, or automatically according to rules devised to enhance the experience, which would be the same or similar to what would be followed if entered manually.

A picklist may be created that includes various descriptive terms that a user may choose, for example, through the user driven application identified in block 118. These terms are provided as metadata in the audio file so a user's selection, for example from a dropdown menu, can identify the audio file or portion of an audio file that fits the user's selection. Rights fields may also be incorporated via metadata tagging that can be used to implement rules or requirements, as described further herein.

In step 126 the combined video and user-defined music selections that change based on the time clock is displayed or otherwise presented to the user.

The steps of illustrative methods described herein may be executed in a different order than shown or described, and some steps may be performed concurrently with others.

Figure 9:
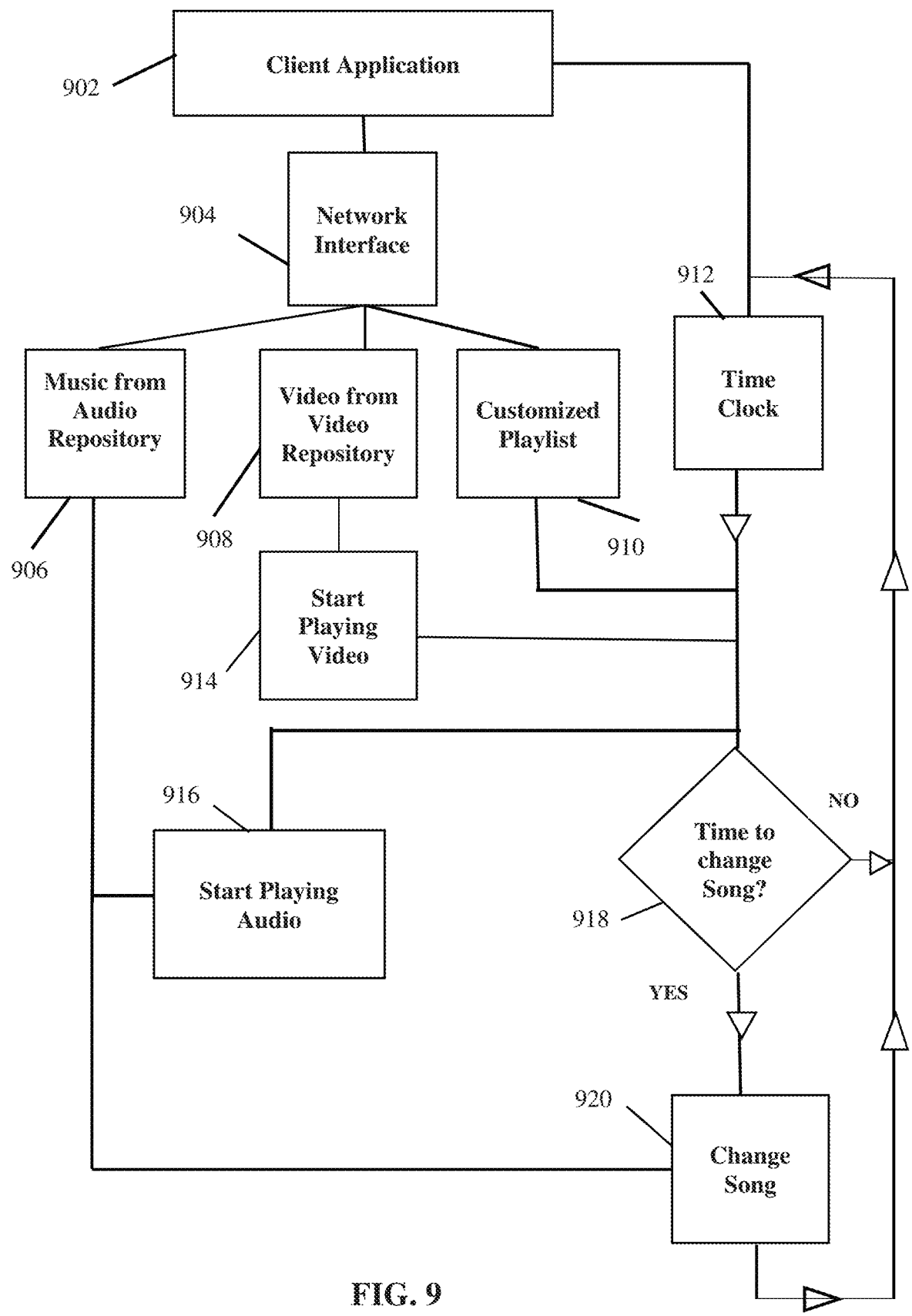
FIG. 9 is a schematic depicting combining a customized play list with audio media files, video media files and a time clock.

FIG. 9 is a schematic depicting combining a customized play list 910 with audio media files 906, video media files 908 and a time clock 912, such as is performed in step 124 of FIG. 1. A client application 902 interfaces with music from audio repository 906, video from video repository 908 and a customized playlist 910 through network interface 904. Client application 902 is also in communication with time clock 912. In an illustrative embodiment, client application 902 runs on an end user device such as a smartphone or personal computer, for example.

In block 914 video is triggered to play, and in block 916 audio is triggered to play, based on media combining application 124. The audio and video are synchronized by a trigger mechanism, such as time clock 912 and the soundtrack script metadata on which the customized music playlist is based. In decision step 918 it is determined whether or not a scripted segment has ended, prompting a change in song or portion of a song in step 920 if the segment has ended, and if not, the present song or segment continues to play until, based on time clock 912, the segment has ended.

The system is configured so the playlist can change with each display of video while maintaining a user's selected music preferences. For example, customized music playlist 122 can be accessed by the "combining" software application used in step 124 each time a video is selected by the user. In another illustrative embodiment, the application applied in step 120 can be run each time a user selects a video to view, which will generate a new customized music playlist. Whether a new playlist is generated or an existing playlist is used, various restrictions rules can be applied either to a single playlist (new or existing) or to a combination of multiple playlists accessed by one or more users.

The software applications described above may be embodied in a single program or may consist of separate programs. Following is further description of each program.

Figure 3:
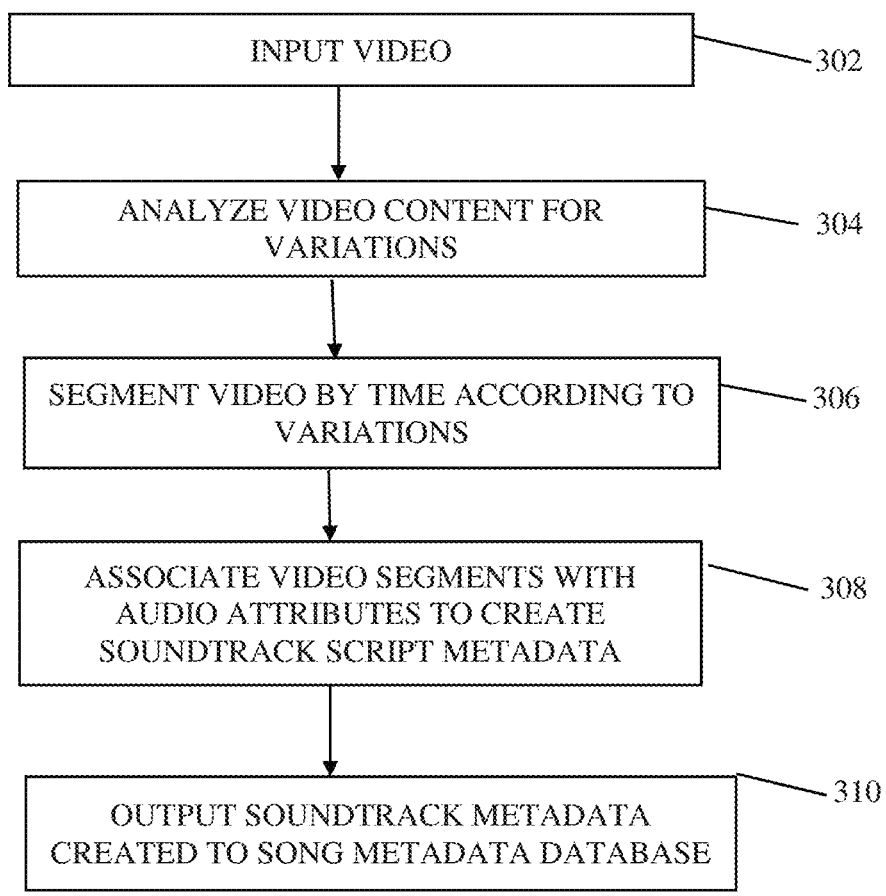
FIG. 3 depicts a flow chart of an illustrative embodiment of a method to create soundtrack script metadata from video or other media.

FIG. 3 depicts a flow chart of an illustrative embodiment of a method to create soundtrack script metadata from video or other media, such as noted in step 106 of FIG. 1. In step 302, a video or other non-audio media file is input to the soundtrack creation application, or retrieved by the application. In step 304 the non-audio media is analyzed to identify changes in the media content or aspects of the media content. Changes in the media content may be determined by any means, such as applying sensors to detect and analyze movement, color changes and brightness variations, for example. Any other detectable variations may be analyzed using sensors or detection methods appropriate to monitor and analyze the changes. In step 306 the non-audio media is segmented in time according to the media content variations by applying a time clock. The media is tagged, i.e. metatags are incorporated into the file to identify temporal media segments. By way of example, in a workout video a portion may include a segment with a strenuous, fast-paced routine, followed by a cooling off period, or slower paced, less strenuous segment. The time clock is implemented to tag the beginnings and ends of the segments. In step 308 the non-audio media segments are associated with audio attributes by use of metatags, to create soundtrack script metadata that can be used later to coordinate the soundtrack with appropriate music, which may take into account a user's preferences. Once the soundtrack script metadata has been created, it is output to a song or other metadata database in step 310.

Figure 4:
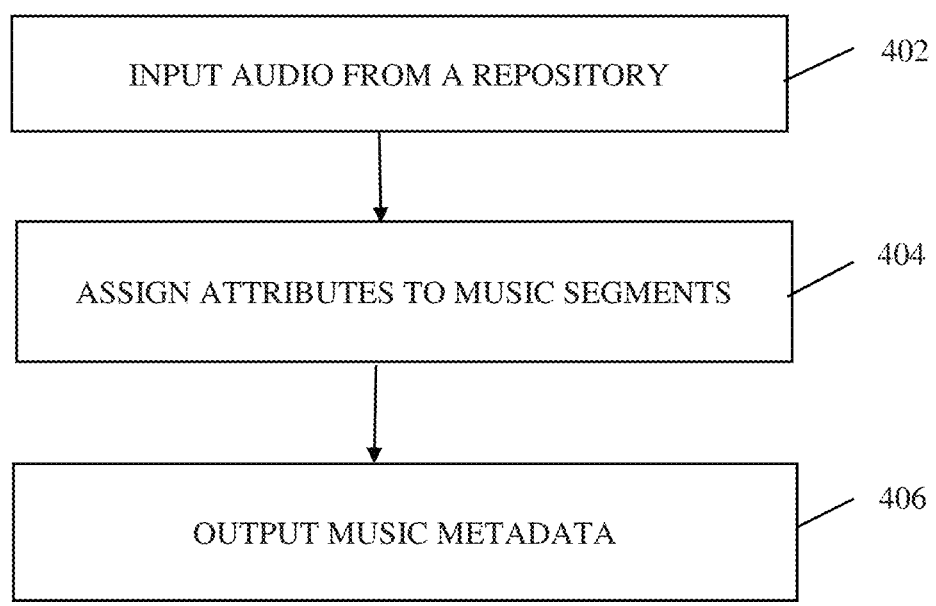
FIG. 4 depicts a flow chart of an illustrative audio metadata attribute creation method.

FIG. 4 depicts a flow chart of an illustrative audio metadata attribute creation method that may be embodied in the software application 114 in FIG. 1. In step 402, audio, such as music from a, audio media repository is input to the software application or accessed by it. In step 404, audio attributes, such as energy level, tempo, key, "danceability," etc. for music, or for sound effects, eerie, machine, animal or nature, for example, are assigned to the inputted audio by embedding metadata into the file. In step 406, the audio metadata is output to an audio metadata database.

Figure 5:
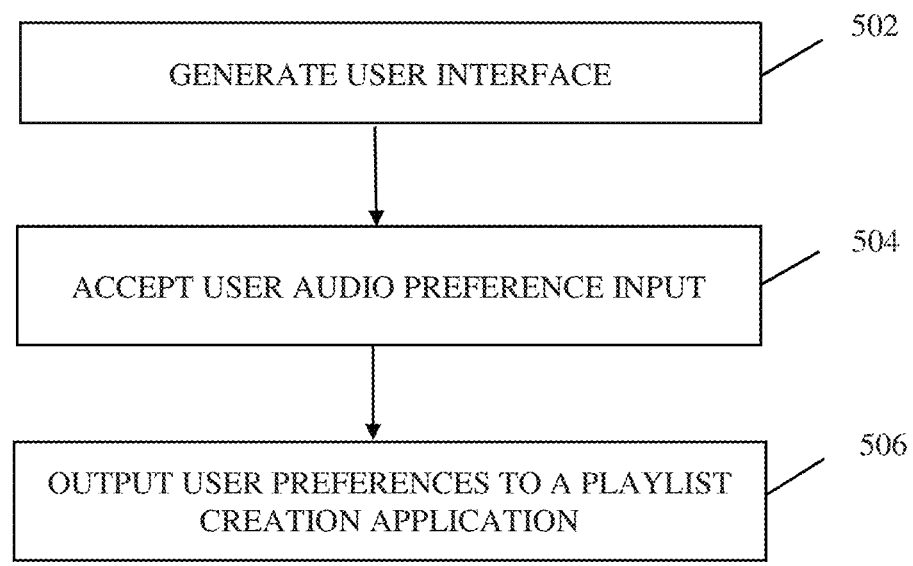
FIG. 5 depicts a flow chart of an illustrative method for a user to select audio preferences.

FIG. 5 depicts a flow chart of an illustrative method for a user to select audio preferences that may be embodied in the software application 118 in FIG. 1. The audio preference application provides a user a user interface in step 502 that may be accessible by a user on a smart phone, laptop computer or other electronic device. The user interface may be accessible after entry of security information, for example a password. The user interface may allow a user to create a new selection of audio preferences, or edit previously entered preferences. The list of preferences will depend, at least in part on the type of audio for which a user is entering preferences. For example, if the audio is music the user may be provided with selections such as, jazz, classical, rock, gospel, techno, emotional spectrum, instrument type, male/female vocalist, artist, theme and culture. The preference selections may be categorized to create a hierarchy of options. For example, a user may first select a time period such as the 1970s. Then within the 1970s a user may select female artists. The user interface may provide some or all options in a single screen or may progress from one category to another. The order that categories are presented to a user may be designed to minimize computing power. So for example, in the previous illustrated process, instead of a user selecting a time period first, the user may first be provided with the opportunity to select female artists. Step 504 includes accepting user input as entered on one or more screens. It is noted the software may be configured to allow a user to may make selections by one or more methods. For example, a user may select preferences by using a keypad or the system can be configured to allow a user to make selections by voice input. In step 506 the user's preferences are output to or accessed by an application to create a customized playlist.

Figure 6:
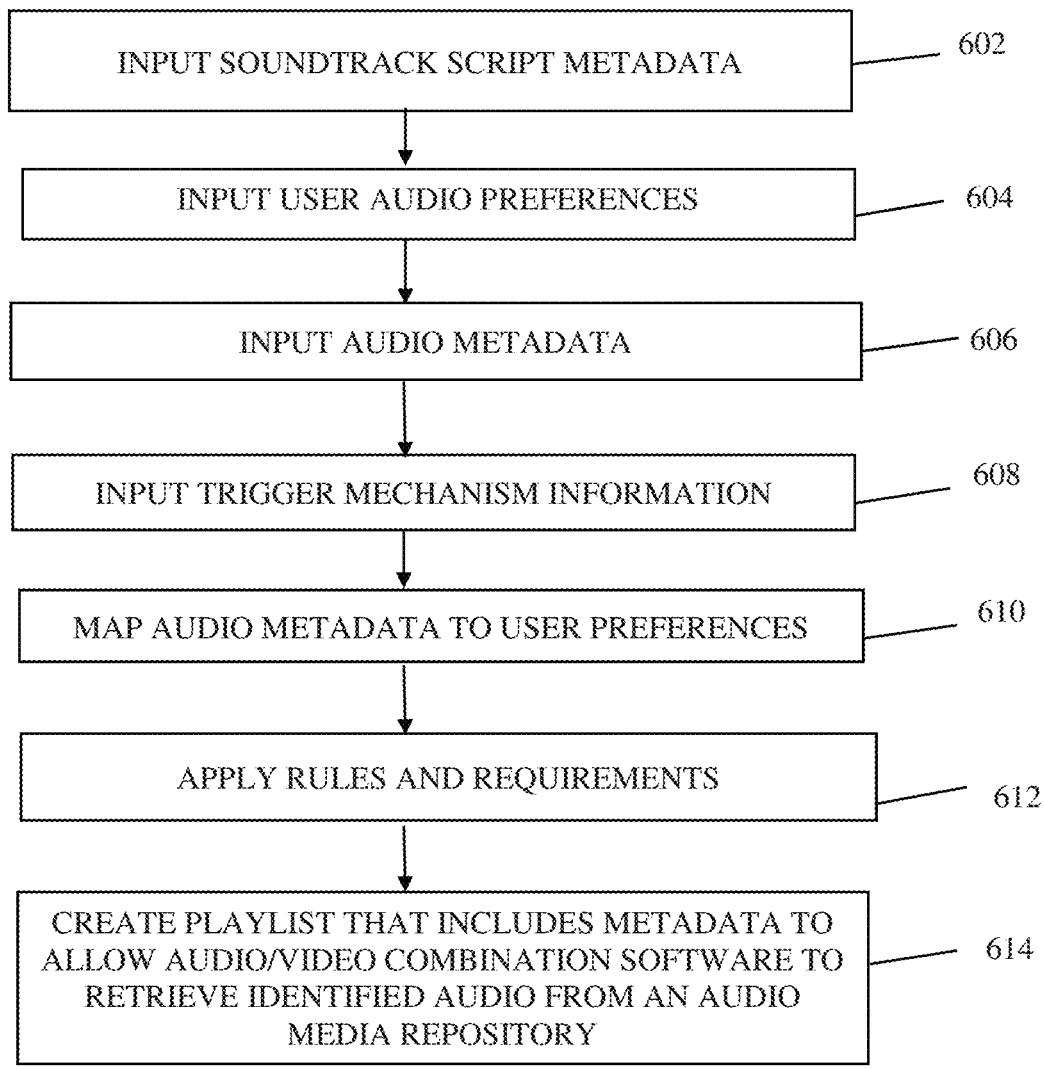
FIG. 6 depicts a flow chart of an illustrative customized playlist creation method.

FIG. 6 depicts a flow chart of an illustrative customized playlist creation method that may be embodied in the software application 120 in FIG. 1. In block 602 of FIG. 6 a file or portion of a file from a soundtrack script metadata database is provided, wherein the file has time codes and audio attributes embedded as metadata. Included in the metadata of the soundtrack script is a time code that may reflect the temporal length of the video that should be associated with a particular audio attribute or attributes and a range. In an illustrative embodiment, metadata encompassed in the soundtrack file may associate the first minute of the segment as lending itself to music having medium tempo, for example 95 beats per minute, or a slow tempo, for example 70 beats/minute. The next two minutes of the three minute video segment may comprise metadata reflecting high energy music. High energy may be, for example, a level of 90 out of 100 or 140 beats per minute. The soundtrack script is tagged according to these attribute requirements so audio from a user's playlist that has these attributes can be mapped to the script.

In step 604 a user's audio preferences are input to the customized playlist creation software or accessed by the playlist creation application.

In block 606 song metadata describing attributes is input to the playlist creation application or accessed by the application. Time clock information is input to, or accessed by, the playlist creation application in block 608.

The playlist creation software matches song metadata to soundtrack metadata, coordinating the two through the time clock. The playlist creation software then matches the user's preferences to the soundtrack script attribute requirements. For example, the application may be instructed through the user preferences input that 1970s rock songs are needed. Input from the soundtrack script metadata to the playlist creation application provides required attributes, for example low energy of approximately 70 beats per minute or within a range of 60-80 beats per minute. In an energy scale of 0-100, this low energy requirement may be equivalent to about 25 on the scale. The algorithm then identifies in song metadata database, songs that match those attributes and the user's preferences.

Once the soundtrack information is matched to the audio attributes metadata, it can be mapped to the user's preferences in step 610.

In step 312 rules and requirements are applied. The application can be configured to evaluate whether a song was played before and how recently it was played. The application may have a rule activated that requires there to be no duplicated songs on the playlist or no duplicated songs played within a threshold amount of time or within a threshold number of songs. The playlist creation application may also have rules governing how many songs from a single album are in the playlist. The playlist creation application may embody various other rules, requirements and prohibitions as described herein.

Figure 7:
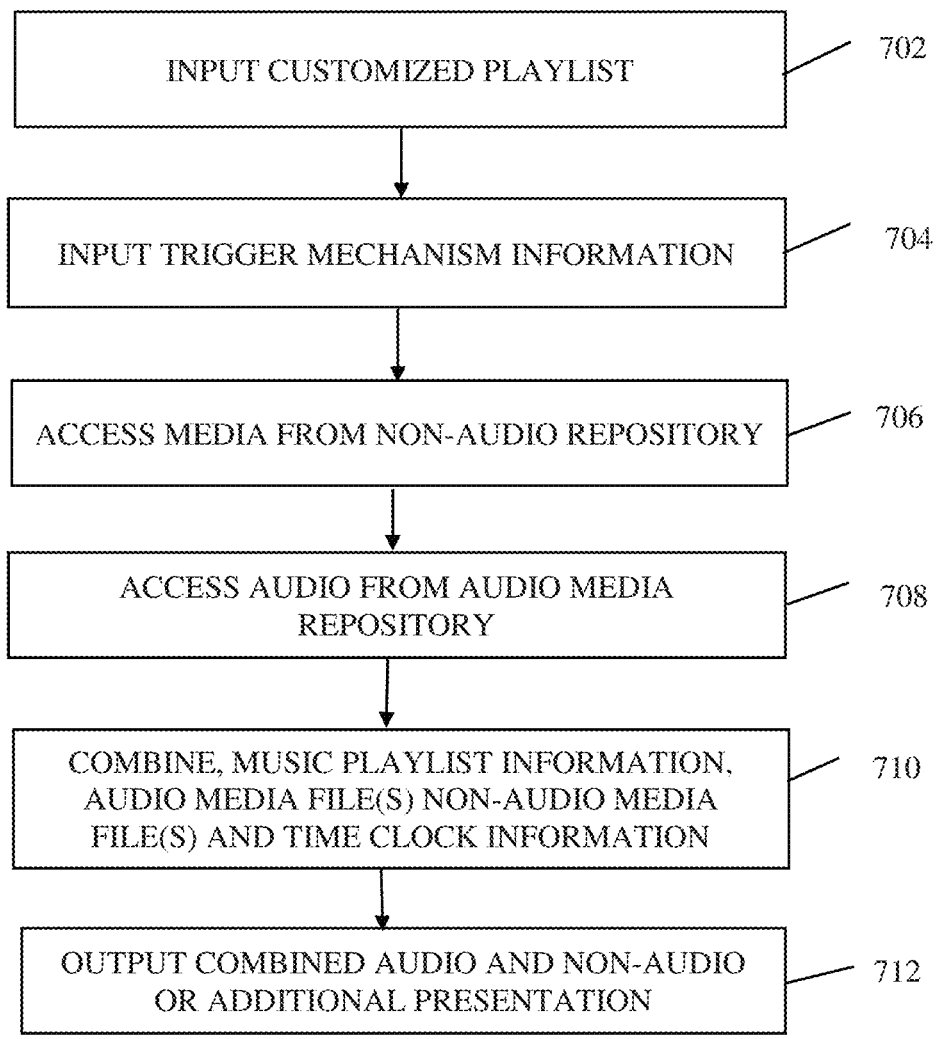
FIG. 7 depicts a flow chart of an illustrative method for combining a customized music playlist, song media files, video or other media files and a time clock to create a video or other media experience.

FIG. 7 depicts a flow chart of an illustrative method for combining a customized music playlist, song media files, video or other media files and a time clock to create a video or other media experience that may be embodied in the software application 124 in FIG. 1.

In step 702, a customized playlist is input to the media combining application, or the application retrieved the customized playlist. In step 704, time clock information is input and is used to coordinate the time stamped non-audio media files and time-stamped customized playlist. In step 706 the application accesses media from a non-audio media repository based on information that is embedded in the customized audio playlist in the routine described with respect to FIG. 6. In step 708, based on the user-defined playlist, the application accesses audio from an audio media repository based on the user's criteria. For example, the accessed audio may be a song or a portion of a song. In step 710 the customized audio playlist application outputs the combined audio and non-audio file(s) to a display device or other hardware by which a user can experience the combined, user-preference-based audio and non-audio media.

Figure 8:
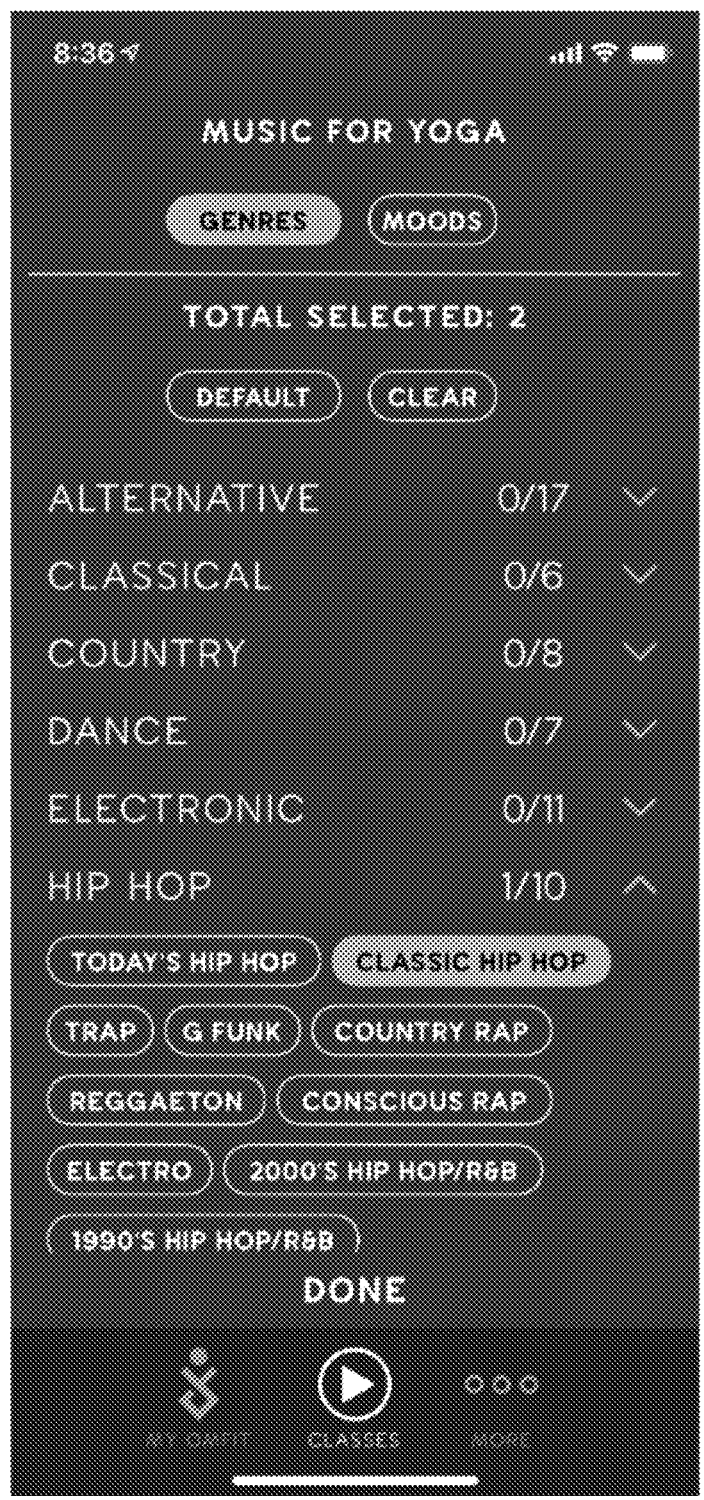
FIG. 8 depicts a user interface to enable a user to enter media preferences.

FIG. 8 depicts an illustrative user interface to enable a user to enter media preferences. User interface 800 provides a list of music types or genres, such as alternative, classical, country, dance, etc. In this embodiment a user may select more than one genre. The number of options within a genre, i.e. sub-genres, is shown adjacent to each genre, preceded by the number of selected options. As can be seen below the "HIP HOP" category, a drop down menu provides the sub-genres that can be selected, such as "Today's Hip Hop," Classic Hip Hop," (selected in this illustration), "Trap," etc.

Illustrative embodiments have been described wherein the user identifies audio preferences, and based on those selections audio is combined with non-audio media or additional audio to create a seamless experience. It is noted though that an analogous process may be used to combine any two types of media. In an illustrative embodiment a user selects video preferences, which are combined with corresponding audio files or segments. For example, a user may select different visual attributes. A music file segments can be tagged with those visual attributes. In an analogous manner as described above for scoring video to be combined with audio, the audio can be scored to create a video montage displayed with the music broadcast.

It is further noted that each of the flowcharts presented include steps that can be executed in a different order or concurrently, as one skilled in the art would understand.

The technology allows a user to choose a music preference, combine it with video or other media, for example, and have the system select the specific music or music parts to coordinate with the video. The technology may also provide different music selections during subsequent uses, while maintaining the user's preferences. The technology can also limit the number of songs from a particular artist when applying music selections. Other thresholds or rules can be implemented with the technology. The technology can also synchronize cross-fading of songs.

By way of illustrative example, one or more of the following rules can be implemented:

in a designated time period, for example three-hours, on a particular channel, no more than a threshold number of different songs, for example three songs, from one album can be played, if no more than a threshold number of songs from the same album are played consecutively, such as two songs for example;

in a designated period, for example three hours, on a particular channel, no more than a designated number of different songs by the same artist, for example four, can be played, if no more than a designated number of songs, for example three, are played consecutively; and in an embodiment in which a user may request songs, providing a delay between the time of request by a transmitting entity or an individual and the time a song is performed, for example, greater than one hour.

In illustrative embodiments, the system is configured so when providing a user or customer combined video and audio based on a user-defined music selection that changes based on a time clock, the webcaster or other provider or transmitting entity may elect one or more of the following:

not to inform the user which songs will be played after the current song, i.e., the provider may elect not to give advanced notice of songs to be played;

to prohibit users from choosing songs on demand;

to identify on its website or displayed elsewhere while the music is playing one or more of the following: (a) title, (b) album, and (c) featured artist;

to not provide interactive services that enables a recipient to receive a transmission of a program specially created for the recipient, or on request, a transmission of a particular sound recording, whether or not as part of a program, which is selected by or on behalf of the recipient;

limiting a playlist to be active only for a designated period time, for example two weeks, after which a user or webmaster or other provider or transmitting entity must create a new playlist; and providing a playlist in which the order of the playlist is not predetermined.

The system can be configure to include these and/or additional restrictions and rules to comply, for example, with obligations or prohibitions imposed on a party such as the transmitting entity.

FIG. 2 is a schematic of a system in which the methods disclosed herein may be implemented, such as combining user-defined music with video or other media. System bus 202 represents a pathway to facilitate data and control signals to moving between major components of the system. FIG. 2 is a simplified schematic of the system, however one of ordinary skill in the art will understand how the structure can be configured and implemented. FIG. 2 shows a server module 230 and a client module 232 configured to communicate through a network 224. Network 224 may be for example, the Internet or a local area network.

The client module 232 includes a system bus 236 through which the other components depicted in FIG. 2. Memory 238 may store, either permanently or temporarily, algorithms, such as application 218 used to combine media files, such as audio with video, and the user-driven music preference selection application 226 for a user to provide music preferences. Any other client side data or algorithms used in embodiments of the invention may be stored in memory 238. The algorithms are stored, for example, as computer code. Processor module 240 comprises one or more computer processors that may execute computer code stored in memory 238 to carry out embodiments of the methods disclosed herein. In illustrative embodiments, video and songs are not stored in random access memory on the client side, and in some instances not stored in random access memory on the server side.

Client module 232 also includes one or more output devices 242. Output devices 242 may include, for example, speakers, display screens or other hardware that allows a user to experience the combined media produced by the methods provided herein.

Server module 230 comprises a system bus 202. System buses 202, 236 may comprise a plurality of components, including a plurality of system buses, each carrying data between a processor and memory and between one another. Data may be carried, wirelessly, through cables/wires, or a combination of the two.

Server module 230 further comprises input device(s) 204, which represent any hardware and associated software needed to input signals and data into the system for operation of other components or to be acted on my various components. Input device(s) 204 may be trigger event generators, for example, a time clock, or other component such as a transmitter that can generate a trigger event. Input device(s) 204 may also be the means by which files from various databases can be input or uploaded to the system.

Application database 206, which may comprise a single database or multiple databases, includes a soundtrack script metadata application, a song metadata attribute application, a user-driven music preference selection application, customized music playlist creation database, and media combining application.

Content database 208, which may comprise a single database or multiple databases, includes a video database, a soundtrack script metadata database, a song metadata database and a song database.

Memory 210 may store algorithms such as algorithm 212 used to create soundtrack script metadata from a video, application 214 to create song metadata attributes describing a music file(s), algorithm 226 for a user to provide music preferences, or algorithm 216 to allow user-selection of music preference to create a customized playlist. Any other data or algorithms used in embodiments of the invention may be stored in memory 210. The algorithms are stored, for example, as computer code. Processor module 220 comprises one or more computer processors that may execute computer code stored in memory 210 to carry out embodiments of the methods disclosed herein.

Network module 222 represents, for example, a provider module to support and implement a provider side of a networking programming interface, or a client module that supports the client side of the network programming interface.

The system may comprise a computer network that includes a group of computer systems and other hardware devices, linked together through communication channels. Alternatively, the system or portions thereof may be housed in a single computer.

Software applications and databases may be locally stored or available on the Internet and in the Cloud. In an illustrative embodiment, a cloud computing platform, such as Amazon Web Services, for example, is used. Such a service may include, infrastructure as a service and platform as a service. The platform may include computational and storage capabilities, software applications, infrastructure management, database management, networking and other information technology resources. The architecture may include a video repository server, an audio repository server, an application server and a database server. Alternatively, or in addition, the system may be set up on local servers.

In an illustrative embodiment, the combined video and user-defined music selection that changes based on the time clock may be streamed to a user over a single channel. In a further illustrative embodiment, separate channels may be used to provide each of the audio and video component. The coordination of the audio and video may be effectuated at various points of the process using algorithms that coordinate the two.

In an illustrative embodiment, the method and system may be implemented using a streaming architecture or service. For example, various subscription services are available to consumers, such as the following channels: YouTube, DIRECTTV, Acorn, Hulu and Amazon Prime. Streamed video and audio may comprise data streamed from a server. A player or a plugin that works as part of a browser decodes and displays the streamed video and audio.

The technology may be used to allow a user to control their own personal musical choices (genres, mood, etc.) that they prefer to listen to, in conjunction with nearly any architected creative media experience. A scripted experience can be provided where the audio director has complete control of the timing, or a live experience can be created where the technology can be integrated with a live switcher-type mechanism to notify the technology to change the music during an event.

Examples of media types that can be combined with user-defined audio, include, for example:
a) Fitness workout videos
b) Sporting event broadcasts
c) Audiobooks
d) Scripted television programs
e) "Reality" television programs
f) Podcasts
g) Talk radio
h) Feature films & documentaries
i) Immersive experiences (i.e. museums or galleries)
j) Theme park rides and experiences.

The detailed description of the technology above can be directly applied to fitness workout videos. The workout video is temporally segmented into portions, wherein the portions may include a specific type of movement or exercise, intensity of workout, or repetition rate of moves, for example. Music containing attributes that coordinate well with each portion of the workout would be coordinated with the video. For example, high workout repetition rate high may be combined with music having a fast tempo.

Sporting event broadcasts may be segmented according to aspects of the event. For example, different plays, time segments between plays, etc.

Audiobooks can be segmented, for example, according to aspects of a story. This may include for example, tense or calm scenes, happy or sad scenarios, and other events in which the tone of the event or discussion may change. Scripted television programs, "reality" television programs, podcasts, feature films and documentaries can be combined with music or other audio in this manner. The combined audiobooks with music is presented to a user through speakers.

The technology described herein may be applied to theme park rides and experiences. For example, on a theme park ride a visitor may encounter various events that would be triggers to presenting audio. For example, in a haunted house, a villain may suddenly appear, accompanied by a change in music that coordinates with the event. The combined media may be presented for a group of riders, for example an individual car of the ride. Alternatively, a user may have a personal app on a smartphone that can be used. The timing of the change in audio, whether associated with the car or a user's personal app, may be triggered by time points in the ride, or by sensors along the way that are coordinated with the app. A user may input their preferences online prior to entering a theme park. The user selection may be associated with the user's entrance ticket by a bar code, radio frequency identification tags, QR codes, computer chips or other electronic technology that can be associated with the necessary information and can trigger the combined media experience. The stored information can then be utilized to customize a ride experience.

Additional illustrative applications of the technology include talk radio broadcasts combined with other audio, and immersive experiences, such as museums or galleries combined with music or other audio.

In each of these illustrative applications, a time clock may be used, or another type of trigger event, such as a sensor, that may detect, for example, various types of electromagnetic radiation, motion, etc.

The system can be configured to create combination audio and media experience in real time, or the files can be created prior to an event or activity taking place.

Advantageously, unlike traditional workout videos, theme park rides, etc. the technology can generate unique playlists each time a specific video is played, activity is experienced, etc., while maintaining a user's preferences. Furthermore, the combined audio and media can include rules that allow it to comply with license agreements, laws and other restrictions that may apply to playing the combined audio and media.

Various embodiments of the invention have been described, each having a different combination of elements. The invention is not limited to the specific embodiments disclosed, and may include different combinations of the elements disclosed, omission of some elements or the replacement of elements by the equivalents of such structures.

While illustrative embodiments have been described, additional advantages and modifications will occur to those skilled in the art. Therefore, the invention in its broader aspects is not limited to specific details shown and described herein. Accordingly, it is intended that the invention not be limited to the specific illustrative embodiments, but be interpreted within the full spirit and scope of the appended claims and their equivalents.

The invention claimed is:

1. A system for combining audio with additional media, activity or an entertainment experience comprising:
   a database of audio metadata attributes describing audio media files, the audio media files obtained from an audio media repository;
   a database of non-user selected soundtrack script metadata associated with a selection from an additional media, activity or entertainment experience repository;
   a trigger mechanism associated with segments of the additional media, activity or an entertainment experience;
   a user-driven software application configured for a user to define audio preferences;
   a processor configure to execute computer code to create a customized audio playlist by interpreting the user-defined audio preferences, soundtrack script metadata, audio metadata attributes and trigger mechanism information;
   a processor configured to execute computer code to combine the customized audio playlist, audio media files, media files, activity or entertainment experience and trigger mechanism information to generate audio combined with the additional media, activity or entertainment experience; and
   a device for presenting the audio combined with additional media, activity or entertainment experience and an audio selection based on the user-defined audio preferences, wherein the audio selection changes based on the trigger mechanism.

2. The system of claim 1 further comprising a processor configured to execute computer code to create the soundtrack script metadata from an item from the additional media, activity or entertainment experience repository.

3. The system of claim 1 further comprising a processor configured to execute computer code to create the audio metadata attributes describing audio media files from the audio repository.

4. The system of claim 1 wherein the system is configured to access the audio media and the additional media, activity or entertainment experience from repositories on different channels.

5. The system of claim 1 wherein the audio media repository comprises songs or musical content.

6. The system of claim 1 wherein the additional media, activity or entertainment experience repository comprises a theme park ride.

7. The system of claim 1 wherein the trigger mechanism is a signal from a sensor.

8. The system of claim 1 wherein the trigger mechanism is a time clock.

9. The system of claim 1 further comprising a processor configured to execute computer code to create audio metadata attributes describing audio media files from the audio repository.

10. The system of claim 1 wherein the additional media, activity or entertainment experience is audio.

11. A method for combining audio with additional media, activity or an entertainment experience comprising:
   obtaining from an audio media repository one or more audio media files;
   providing a database of audio metadata attributes describing the one or more audio media files;
   selecting a one or more additional media, activity or entertainment experience files from an additional media, activity or entertainment experience repository;
   providing a database of non-user selected soundtrack script metadata associated with the selection from the additional media, activity or entertainment experience repository;
   obtaining a signal from a trigger mechanism wherein the trigger mechanism is associated with segments of the additional media, activity or entertainment experience;
   defining by a user one or more audio preferences;
   creating a customized audio playlist by interpreting the user-defined audio preferences, soundtrack script metadata, audio metadata attributes and trigger mechanism information;
   combining the customized audio playlist, audio media files, media, activity or entertainment experience files and trigger mechanism information to generate audio combined with the additional media, activity or entertainment experience; and
   presenting the audio combined with the additional media, activity or entertainment experience and an audio selection based on the user-defined audio preferences, wherein the audio selection changes based on the trigger mechanism.

12. The method of claim 11 further comprising creating the soundtrack script metadata from an item from the additional media, activity or entertainment experience repository.

13. The method of claim 11 further comprising creating the audio metadata attributes describing audio media files from the audio repository.

14. The method of claim 11 comprising accessing the audio media and the additional media, activity or entertainment experience from repositories on different channels.

15. The method of claim 11 wherein the audio media repository comprises songs or musical content.

16. The method of claim 11 wherein the additional media, activity video or entertainment experience repository comprises a theme park ride.

17. The method of claim 11 wherein the trigger mechanism is a signal from a sensor.

18. The method of claim 11 wherein the trigger mechanism is a time clock.

19. The method of claim 11 further comprising creating audio metadata attributes describing audio media files from the audio repository.

20. The method of claim 11 wherein the additional media, activity or entertainment experience is audio.

21. A non-transitory computer readable medium with computer executable instructions stored thereon executed by a processor to perform the method of:
   obtaining from an audio media repository one or more audio media files;
   providing a database of audio metadata attributes describing the one or more audio media files;
   selecting a one or more additional media, activity or entertainment experience files from an additional media, activity or entertainment experience repository;
   providing a database of non-user selected soundtrack script metadata associated the selection from the additional media, activity or entertainment experience repository;
   obtaining a signal from a trigger mechanism wherein the trigger mechanism is associated with segments of the additional media, activity or entertainment experience;
   defining by a user one or more audio preferences;
   creating a customized audio playlist by interpreting the user-defined audio preference(s), soundtrack script metadata, audio metadata attributes and trigger mechanism information;
   combining the customized audio playlist, audio media files, media, activity or entertainment experience files and trigger mechanism information to generate audio combined with the additional media, activity or entertainment experience; and
   presenting the audio combined with the additional media, activity or an entertainment experience and an audio selection based on the user-defined audio preferences, wherein the audio selection changes based on the trigger mechanism.

* * * * *